United States Patent [19]

Schiller et al.

[11] Patent Number: 5,458,024
[45] Date of Patent: Oct. 17, 1995

[54] APPARATUS AND METHOD FOR RECOVERY OF SILVER

[75] Inventors: Edward E. Schiller; Mark J. George, both of St. Charles, Mo.

[73] Assignee: Trebla Chemical Company, St. Louis, Mo.

[21] Appl. No.: 255,253

[22] Filed: Jun. 7, 1994

[51] Int. Cl.[6] .................................. C22B 3/02; C22B 3/46
[52] U.S. Cl. ................................ 75/713; 75/733; 266/170
[58] Field of Search ............................... 266/170; 75/713, 75/733

[56] References Cited

U.S. PATENT DOCUMENTS

| | | |
|---|---|---|
| 2,194,056 | 3/1940 | Quaglia . |
| 3,369,801 | 2/1968 | Hartman . |
| 3,655,175 | 4/1972 | Zeleny et al. . |
| 3,705,716 | 12/1972 | Hendrickson . |
| 3,792,845 | 2/1974 | Larson et al. . |
| 4,325,732 | 4/1982 | Woog . |
| 4,662,613 | 5/1987 | Woog . |
| 5,004,212 | 4/1991 | Gutierrez . |

FOREIGN PATENT DOCUMENTS 8905866  6/1989  WIPO .................................. 266/170

*Primary Examiner*—Melvyn Andrews
*Attorney, Agent, or Firm*—Eugene Stephens & Associates

[57] ABSTRACT

An improved apparatus and method for recovering metallic silver from solutions containing silver ions by reducing silver ions and oxidizing an element in the electromotive series above silver, such as iron. The apparatus provides plug flow of solution into the reaction media and thereby eliminates the principal cause of channelling and premature failure of the media. A distribution chamber distributes solution uniformly to a porous pad of tangled threads or fibers ahead of the media. This ensures a planar flow front of solution as it enters and passes through the media. In a preferred embodiment, the pad is resilient and is supported by a highly open grating. By eliminating the flow and pressure imbalances or gradients at the entry to the media which are inherent in previous apparatus designs, the invention prevents or greatly retards the onset of channelling or plugging of the media.

15 Claims, 3 Drawing Sheets

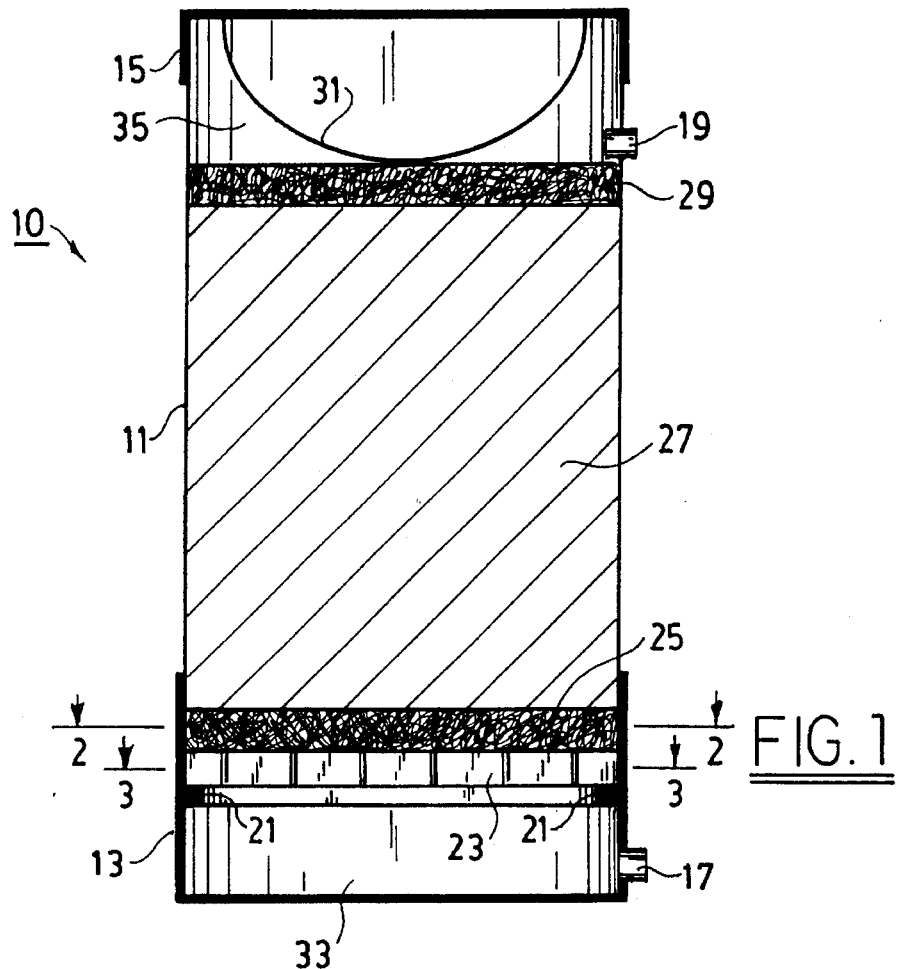
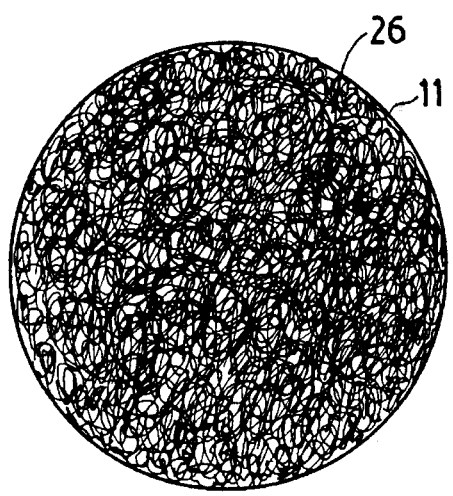
FIG.2
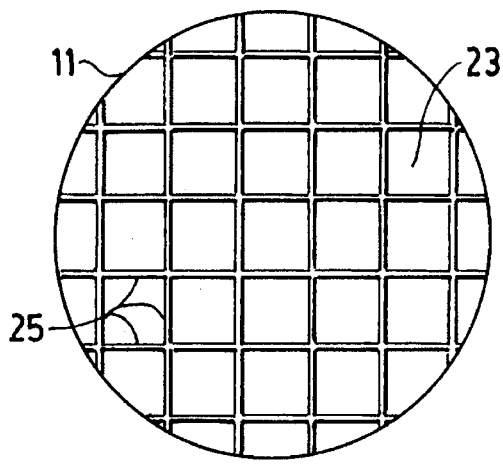
FIG.3

APPARATUS AND METHOD FOR RECOVERY OF SILVER

FIELD OF THE INVENTION

The invention relates to an improved apparatus and method for efficient recovery of silver from waste solutions of photographic processing.

BACKGROUND OF THE INVENTION

Spent photographic processing solutions such as developers, fixers, bleach-fix, bleach, stabilizers, super stabilizers, washing aids, and wash water contain dissolved silver ions which can be economically recovered as metallic silver. Various types of apparatus have been disclosed, many of which rely on reduction of silver ions by an active metal having a higher electromotive potential than silver, such as iron. The sacrificial metal is oxidized and dissolved when the silver ions are reduced. Typically, these devices include a flow-through reaction zone in a chamber packed with active metal in finely divided form such as powder, turnings, filings, chips, wound wire, woven wire, wool, or chopped wool. Solution enters the apparatus through an inlet, deposits silver and dissolves iron while passing through the metal media in the reaction zone, and discharges through an outlet to drain. Eventually, the media is consumed or fouled so that exchange no longer occurs. The media is then replaced with fresh material, and the silver-rich precipitate is sent to a smelter.

As metal media is consumed, a reaction sludge forms which tends to plug progressively the microscopic pathways through the media. This reduces the surface area available for further reaction, reduces the effective volume of the media, increases the flow velocity, and shortens the residence time of the solution in the reaction zone. In response to these higher solution velocities, preferred flow channels can develop in the media and exchange efficiency can decrease rapidly, resulting in premature failure of the apparatus.

Many of the known apparatus designs purport to improve reaction rate, efficiency, and useful life by minimizing this well-known and serious problem of media channelling, but do not recognize fully a root cause of the problem, which is nonuniform distribution of solution pressure and flow at the entry to the media.

Many known designs use a perforated plate or grid near the inlet to support the media and to provide solution access to the media. See, for example, U.S. Pat. No. 5,004,212 to Gutierrez, Apr. 2, 1991; U.S. Pat. No. 3,792,845 to Larson et al., Feb. 19, 1974; U.S. Pat. No. 3,705,716 to Hendrickson, Dec. 12, 1972; U.S. Pat. No. 3,369,801 to Hartman, Feb. 20, 1968; and U.S. Pat. No. 2,194,056 to Quaglia, Mar. 19, 1940. Such a plate has a relatively small and finite number of holes and is by its nature a discontinuous distributor, having the web of the plate between the holes. Channelling and consequent plugging develop in the media in the vicinity of each hole in the plate, and media between the holes becomes shielded from further exposure to silver-bearing solution.

The apparatus disclosed in U.S. Pat. No. 3,655,175 to Zeleny et al., Apr. 11, 1972, supports its media on a layer of inert mineral chips in an effort to overcome channelling, but this layer is still a discontinuous distributor resting on a perforated plate, so channelling is still not prevented.

The apparatus disclosed in U.S. Pat. No. 4,325,732 to Woog, Apr. 20, 1982, has its chamber filled with a fiberglass mat axially wound with media particles to keep the media discrete. This design purports to prevent channelling. However, the volume of the inert fiberglass reduces the amount of reactive media and therefore reduces substantially the overall capacity of the unit.

U.S. Pat. No. 4,662,613 to Woog, May 5, 1987, discloses a variant of his '732 apparatus which incorporates a combined radial and axial distributor and concentric spacers in an inlet distribution chamber to purportedly overcome unfavorable media distortions at the entry and exit of the unsupported media in the former apparatus. This design still suffers from a capacity penalty.

SUMMARY OF THE INVENTION

I have found that channelling can be minimized and useful lifetime maximized in a metal-exchange type silver recovery unit by providing substantially uniform axial flow rate, also known as plug flow, of solution at all points in the reaction media. This is accomplished by providing (a) uniform pressure in a reservoir supplying solution to the media and (b) substantially uniform distribution of solution pressure and hence flow velocity at the entry to the media. Uniform pressure can be provided by a relatively large, featureless reservoir. A substantially uniform distributor includes a porous pad of tangled threads or fibers adjacent to the media, whereby essentially plug flow of solution is presented to the media. In a preferred vertically oriented embodiment, the porous pad can be supported by a light but strong grating having thin struts or ribs which do not significantly degrade the uniformity of the pressure field of the flowing solution.

DRAWINGS

FIG. 1 is a vertical cross-sectional view of a preferred embodiment of the invention.

FIG. 2 is a cross-sectional view of a distribution pad according to the invention, taken along Line 2—2 in FIG. 1.

FIG. 3 is a cross-sectional view of a support grating according to the invention, taken along Line 3—3 in FIG. 1.

DETAILED DESCRIPTION OF THE INVENTION

Figure 4:
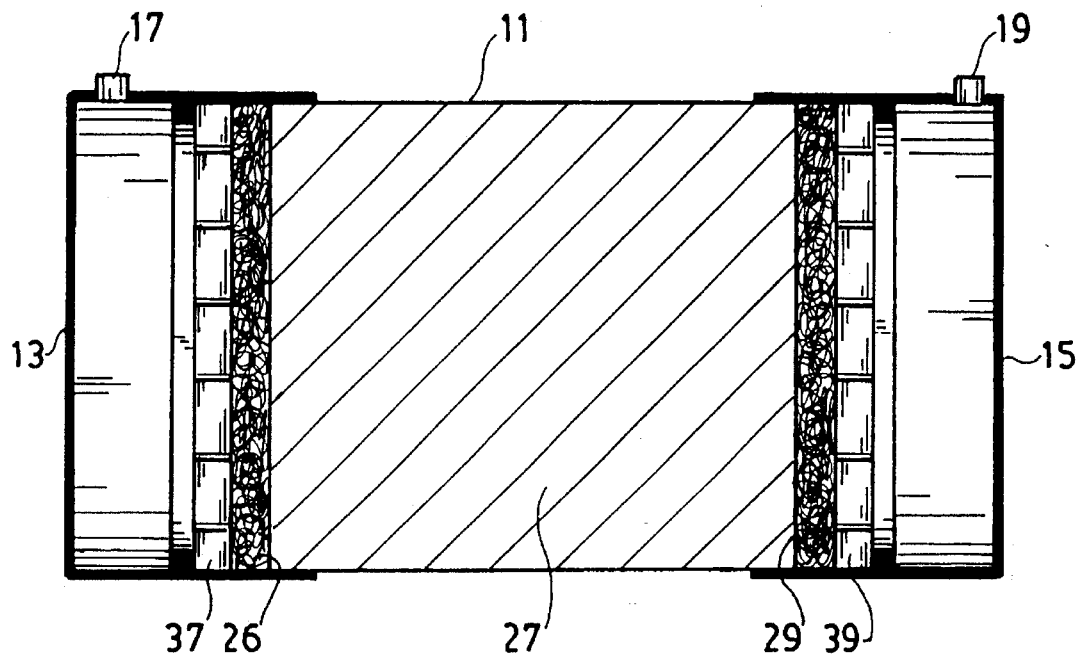
FIG. 4 is a cross-sectional view of an alternative embodiment of the invention.

The invention comprises an improved apparatus and method for recovering metallic silver from aqueous solutions of silver ions, a preferred embodiment 10 of which is shown in FIG. 1. A housing 11 is adapted to receive and mate sealably with bottom cap 13 and top cap 15. Means for sealing is not shown but can be any well-known design such as, for example, threads, cam-locks, lever-lock, or adhesive. One preferred arrangement is gluing on the bottom cap and securing the top cap with a hose clamp so that it is easily removed. The housing and both caps can be made of any material resistant to chemical attack by the solutions to be treated. Typically, they are made of an inexpensive, resistant, tough plastic such as polyvinyl chloride. Also typically, bottom cap 13 is permanently attached to housing 11, while top cap 15 is removable for servicing the interior of apparatus 10. Bottom cap 13, or a lower region of housing 11, is fitted with an inlet 17 which is connectable to a pressurized source of silver-ion-bearing solution (not shown). Top cap 15, or an upper region of housing 11, is fitted with an outlet 19 which can be connected to a drain, reservoir, or an additional recovery apparatus. Within bottom cap 13 and spaced apart from the end thereof is support bracket 21 attached to the inner wall of bottom cap 13. Bracket 21 can be a circular fixture attached to cap 13 around its entire inner periphery, or it can comprise a plurality of discrete bracket elements spaced from each other.

Support grating 23 rests on bracket 21 and can either be attached to bracket 21 or remain loose. Alternatively, grating 23 can stand on legs or a retaining ring (not shown) on bottom cap 13 and bracket 21 can be omitted. Preferably, grating 23 fits snugly within the bore of housing 11. FIG. 3 shows a cross section of a grating typical of the invention. Grating 23 is designed to have great strength axially while presenting minimal flow resistance and has ribs 25 which are, for example, about 0.06 inch transversely and about 0.50 inch axially. A typical grating pattern is about 0.50× 0.50 inch squares, with an open area of about 75%; even larger open areas are possible. Grating 23 can be made of any strong, rigid, resistant material, for example, cast or injection-molded ABS or PVC plastics.

Grating 23 supports distribution pad 26 which consists of tangled threads or fibers fused or compressed into a porous, resilient mat, as shown in FIG. 2. Grating 23 can be omitted if a suitable structure, such as a baffle system, is available to support pad 26, which is essentially a relatively coarse, thick, plastic felt. Pad 26 fits snugly within the bore of housing 11 and can be, for example, from about 0.125 inch to about 2 inches thick. Pad 26 is made typically from plastic threads resistant to attack by the solutions being processed and resembles material commercially available as pads for mechanical floor scrubbers. Pad 26 can also be formed of fiberglass or a natural textile material.

Media 27 is a metal selected from those elements above silver in the electromotive series. Iron is preferable, usually in the form of wool, chopped wool, turnings, weavings, chips, filings, or powder, all of which are characterized by having a very large surface-to-volume ratio. Preferably, media 27 is iron wool or steel wool chopped into particles about 0.25 inch in size. Media 27 is supported by pad 26 and grating 23 and is packed snugly into housing 11 to prevent channelling of solution along the inner walls. Pad 26 is fine enough that media 27 is supported and cannot fall through.

Above metal media 27 is a retaining pad 29, similar in size and composition to pad 26, which keeps the media in place during operation. Pad 29 can be secured by spring bail 31 within top cap 15 or by a retaining ring that fits inside the housing against the housing wall. The same type of ring can be used to support grating 23 in the bottom.

The region within bottom cap 13 below grating 23 is a distribution chamber 33, which is a simple chamber supplied with solution through inlet 17. Chamber 33 is sufficiently large so that there are no pressure gradients within the reservoir of solution within chamber 33.

In operation, silver-ion-bearing solution enters the apparatus through inlet 17, creating a reservoir of solution at a substantially uniform pressure within chamber 33. Further entering flow causes solution to rise through grating 23 and distribution pad 26. Because pad 26 is a porous pad of randomly oriented, tangled threads or fibers, the solution passes through the pad with no preferred passages and enters all areas of media 27 at a substantially uniform velocity, flow rate, and pressure, thereby percolating in plug flow through media 27 with no incentive to channelling. Substantially uniform velocity and flow rate means that there is no transverse flow of solution and no velocity gradients within the solution as it enters the media. Silver ions are converted to metallic silver as ferrous ions are dissolved. The silver-ion-depleted solution rises into upper chamber 35 above retaining pad 29 and exits the apparatus through outlet 19. Alternatively, the apparatus can be connected such that flow occurs in the opposite direction, wherein 19 is the inlet and 17 the outlet, with equivalent performance of the apparatus, provided that upper chamber 35 is large enough to provide uniform pressure to porous pad 29.

Since channelling is enhanced by high flow rates, the flow rate through the apparatus should be about one media volume of solution per about 50 volumes of media per minute. Thus, the average solution residence time should be around 50 minutes. In a typical application, the media is able to function satisfactorily for a throughput of about 50 to about 200 media volumes of solution. Thus, the apparatus can effectively remove silver ions from waste photographic solutions for between about 40 hours and about 350 hours, depending upon the silver ion content of the incoming solution. For applications in which the flow must exceed the recommended rate, multiple units can be connected either in parallel or in series to achieve the high reducing efficiencies which characterize apparatus according to the invention.

Figure 5:
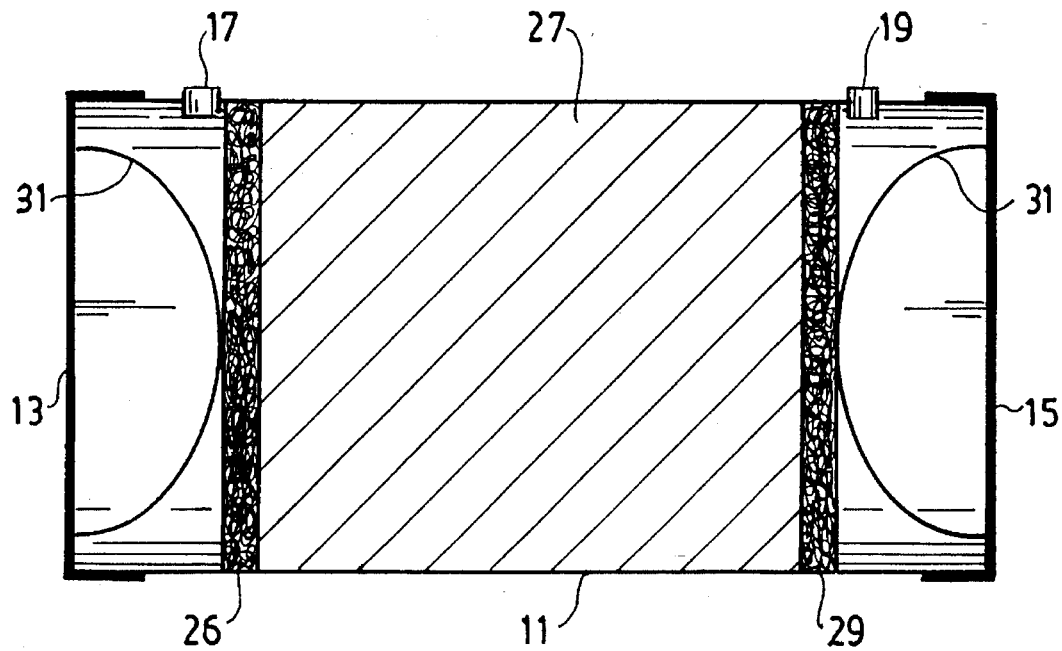
FIG. 5 is a cross-sectional view of another alternative embodiment of the invention.

An alternative embodiment of the invention is shown in FIG. 4, in which an apparatus according to the invention is oriented horizontally. Porous pads 26 and 29 retain the media 27 therebetween. Gratings 37 and 39 can be used to hold pads 26 and 29, respectively, in place. Alternatively, pads 26 and 29 can be sufficiently stiff to retain the media themselves without resort to gratings, requiring only bales 31 or something similar to hold them in place, as shown in FIG. 5. As in the embodiment of FIG. 1, the apparatus of FIGS. 4 and 5 can be connected for flow in either direction.

Figure 6:
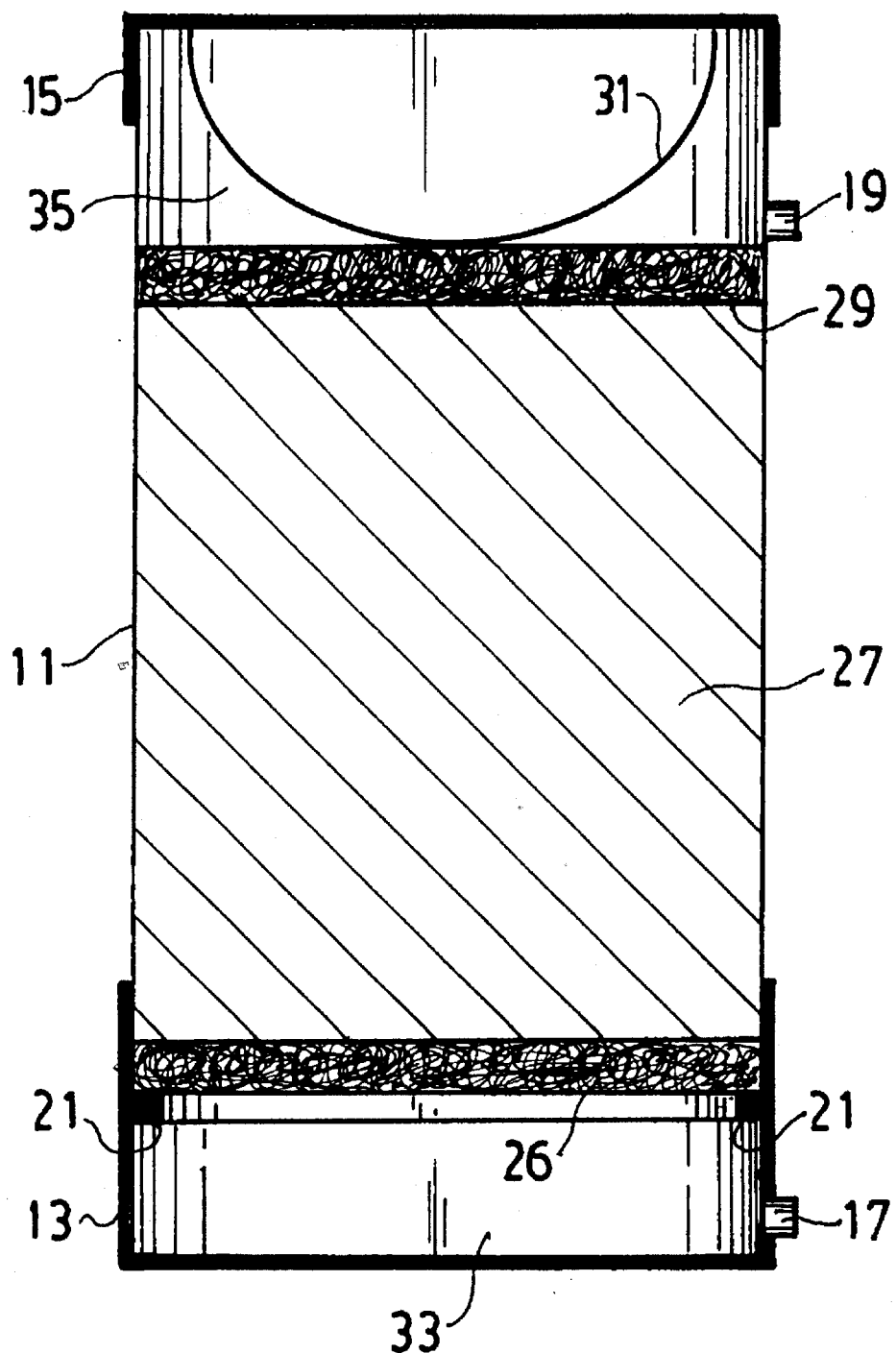
FIG. 6 is a cross-sectional view of an alternative embodiment of the apparatus shown in FIG. 1.

Stiff pads such as those shown in FIG. 5 can also be used in an alternative embodiment to FIG. 1, as shown in FIG. 6, wherein support grating 23 is omitted and inlet pad rests directly on bracket 21.

Example

The apparatus of FIG. 1 was compared to four commercially available silver recovery units under common conditions of flow rate and silver ion content of the test solution. The silver ion content of the solution leaving the units was recorded and plotted against the number of gallons of solution passed through the units.

| Silver Ion Content of Unit Effluent, In Parts Per Million | | | | | |
|---|---|---|---|---|---|
| Gallons Processed | Subject Apparatus | Unit W | Unit X | Unit Y | Unit Z |
| 4 | | | 0.19 | 1.76 | 0.15 |
| 17 | | | 0.54 | 221.00 | |
| 22 | | | 2.18 | 395.50 | |
| 24 | | | | 418.00 | |
| 26 | 0.24 | | 2.59 | | 0.16 |
| 31 | | | 7.40 | | |
| 52 | | 5.48 | | | |
| 54 | 0.09 | | | | |
| 60 | | 8.34 | | | 0.47 |
| 64 | | | | | 92.80 |

-continued

Silver Ion Content of Unit Effluent, In Parts Per Million

| Gallons Processed | Subject Apparatus | Unit W | Unit X | Unit Y | Unit Z |
| --- | --- | --- | --- | --- | --- |
| 66 | | 12.71 | | | 140.40 |
| 106 | 0.25 | | | | |
| 170 | 1.01 | | | | |
| 225 | 1.09 | | | | |
| 267 | 4.88 | | | | |
| 276 | 25.49 | | | | |
| 300 | 48.91 | | | | |

This shows clearly the advantage in effectiveness and capacity of the media afforded by the subject invention. Unit W was unable to lower the silver ion concentration of its effluent to below 1 ppm at any volume tested; Unit X at fewer than 22 gallons throughput; Unit Y at no condition tested; and Unit Z at fewer than 64 gallons. The subject invention processed nearly 170 gallons of solution before reaching this level and handled more than 250 gallons before declining steeply in performance.

The invention may be embodied in other specific forms without departing from the spirit or essential characteristics thereof. The present embodiments, therefore, are to be considered as only illustrative and not restrictive.

We claim:

1. Apparatus for recovering silver from photographic processing solutions by reducing silver ions in the presence of a reactive metal above silver in the electromotive series when said solutions are passed through said apparatus, wherein said apparatus comprises:

(a) a closed housing having an inlet end, an outlet end, and a longitudinal bore;

(b) an inlet in said inlet end to admit solution to said apparatus;

(c) an outlet from said outlet end to discharge treated solution from said apparatus;

(d) a media comprising said reactive metal disposed within said housing between said inlet and said outlet and occupying the full cross-sectional area of said housing bore over a portion of the length of said bore; and (e) means to provide substantially uniform velocity and uniform flow of said solution to an inlet end of said media over said full cross-sectional area of said housing bore.

2. The apparatus of claim 1 wherein said means comprises a porous pad of tangled threads or fibers adjacent to said inlet end of said media.

3. The apparatus of claim 2 wherein said means further comprises a chamber within said inlet end of said housing and ahead of said porous pad wherein said solution is at a substantially uniform pressure across the full cross-sectional area of said housing bore.

4. The apparatus of claim 2 further comprising a second porous pad adjacent to the opposite end of said media.

5. The apparatus of claim 2 wherein said porous pad at said inlet end of said media is between about 0.125 inch and about 2.0 inches thick.

6. The apparatus of claim 2 wherein said means further comprises a grating to retain said porous pad within said housing, said grating having an open area of about 75%.

7. The apparatus of claim 1 wherein said reactive metal media is in the form of powder, turnings, filings, chips, wire weavings, wire windings, wire wool, chopped wire wool, or any combination thereof.

8. The apparatus of claim 1 wherein said housing is substantially cylindrical.

9. Apparatus for recovering silver from photographic processing solutions by reducing silver ions in the presence of a reactive metal above silver in the electromotive series when said solutions are passed through said apparatus, wherein said apparatus comprises:

(a) a closed housing having an inlet end, an outlet end, and a bore;

(b) an inlet in said inlet end to admit solution to said apparatus;

(c) an outlet from said outlet end to discharge treated solution from said apparatus;

(d) a media comprising said reactive metal disposed within said housing between said inlet and said outlet and occupying the full cross-sectional area of said housing bore over a portion of the length of said bore;

(e) a transverse porous pad disposed within said housing bore adjacent to said media to ensure uniform entry of solution from said pad directly into one end of said media without channelling of said media, said porous pad being of such extent as to occupy the entire cross-sectional area of said housing bore; and (f) a transverse grating disposed within said housing below and supporting said porous pad and said media, said grating permitting flow of said solution over the entire area of said pad, and said grating being fixed at a distance from said inlet end of said housing to form a reservoir therein.

10. Apparatus for recovering silver from photographic processing solutions by reducing silver ions in the presence of a reactive metal above silver in the electromotive series when said solutions are passed through said apparatus, said apparatus having a closed housing with an inlet and an outlet and reactive media therein, wherein the improvement comprises:

(a) a distribution chamber upstream of said media, said chamber providing solution at uniform pressure across the full cross-sectional area of said housing; and (b) a transverse porous pad between said distribution chamber and said media and occupying the full cross-sectional area of said housing to ensure uniform entry of solution into one end of said media without channelling of said media.

11. A method for recovering silver from a solution containing silver ions, comprising the steps of:

(a) distributing said solution at a substantially uniform pressure across the face of a porous pad;

(b) passing said solution through said porous pad at substantially uniform flow velocity at all points across said pad, said pad being such as to prevent any flow of solution around said pad; and (c) passing said solution in substantially plug flow into and through a media volume of the same cross-sectional shape and extent as said porous pad, said media comprising an element from above silver in the electromotive series to reduce said silver ions and oxidize said element within said media volume.

12. The method of claim 11 wherein the rate of said substantially plug flow is such that a volume of said solution equal to about one-fiftieth of the volume of said media volume enters said media volume per minute.

13. The method of claim 11 wherein a volume of said solution equal to between about 50 and about 200 times the volume of said media volume passes through said media volume before said media becomes exhausted.

14. The method of claim 11 further comprising one or more additional treatments of said solution substantially identical with the method of claim 11.

15. The method of claim 11 further comprising dividing said solution into a plurality of streams prior to said distributing step and treating each stream according to the method of claim 11.

* * * * *